US012770873B2

(12) United States Patent
Zheng et al.

(10) Patent No.: US 12,770,873 B2
(45) Date of Patent: *Oct. 20, 2026

(54) SODIUM NICKELATE CATHODE MATERIAL SYNTHESIS UTILIZING PERSULFATE DESODIATION AND OXIDATION AND USES THEREOF

(71) Applicant: Energizer Brands, LLC, St. Louis, MO (US)

(72) Inventors: Guanghong Zheng, Westlake, OH (US); Stephen Dukuslow, Parma, OH (US); Devin Kelly, Westlake, OH (US)

(73) Assignee: Energizer Brands, LLC, St. Louis, MO (US)

( * ) Notice: Subject to any disclaimer, the term of this patent is extended or adjusted under 35 U.S.C. 154(b) by 116 days.

This patent is subject to a terminal disclaimer.

(21) Appl. No.: 18/301,561

(22) Filed: Apr. 17, 2023

(65) Prior Publication Data

US 2024/0128449 A1 Apr. 18, 2024

Related U.S. Application Data

(60) Provisional application No. 63/363,059, filed on Apr. 15, 2022.

(51) Int. Cl.
*H01M 4/525* (2010.01)
*C01G 53/42* (2025.01)

(52) U.S. Cl.
CPC ............ *H01M 4/525* (2013.01); *C01G 53/42* (2013.01); *C01P 2002/50* (2013.01); *C01P 2002/72* (2013.01); *C01P 2006/40* (2013.01)

(58) Field of Classification Search
CPC ............................... Y02E 60/10; H01M 4/525
See application file for complete search history.

(56) References Cited

U.S. PATENT DOCUMENTS

| | | | | |
|---|---|---|---|---|
| 2021/0094841 | A1 | 4/2021 | Zheng | |
| 2023/0138630 | A1 | 5/2023 | Zheng | |
| 2023/0361293 | A1* | 11/2023 | Ranganathan ........ | H01M 4/049 |

FOREIGN PATENT DOCUMENTS

| | | | |
|---|---|---|---|
| WO | WO 2017/004121 | A1 | 1/2017 |
| WO | WO 2021/062095 | A1 | 4/2021 |

OTHER PUBLICATIONS

International Search Report and Written Opinion for PCT/US2023/018836 (ISA/EP) mailed Aug. 7, 2023 (15 pages).

(Continued)

*Primary Examiner* — Khanh T Nguyen
(74) *Attorney, Agent, or Firm* — Alston & Bird LLP

(57) ABSTRACT

Methods of preparing desodiated and oxidized sodium nickelate materials using persulfate solution, and sodium nickelate materials prepared by such methods, are disclosed. Also disclosed are methods of preparing pre-aged beta nickelates using a hydroxide solution, and beta nickelates prepared by such methods. An alkaline cathode composition comprising electrolytic manganese dioxide and the desodiated and oxidized sodium nickelate and beta nickelates are also provided, as are alkaline electrochemical cells comprising these nickelates and compositions.

7 Claims, 12 Drawing Sheets

(56) References Cited

OTHER PUBLICATIONS

Park, Kyusung et al., "Electrochemical and Chemical Properties of $Na_2NiO_2$ as a Cathode Additive for a Rechargeable Sodium Battery," Chemistry of Materials, vol. 27, No. 19, Sep. 11, 2015 (7 pages).
Delmas, C et al., "From Sodium Nickelate to Nickel Hydroxide" Solid State Ionics, North Holland Pub Co, vol. 28, Jan. 1, 1988 (6 pages).
Bin Yang, Zhanhong Yang, Suqin Wang and Hongyan Chen, Effect of C48H26N8 coating on electrochemical performance of alkaline super iron battery, Oct. 4, 2012, Journal of Electroanalytical Chemistry, 3-10, 687 (2012).
C. Delmas, J.J. Braconnier, Y. Borthomieu and M. Figlarz, From Sodium Nickelate to Nickel Hydroxide, Solid State Ionics, pp. 1132-1137, vol. 28-30(1988).
Chao Yan, Lingyue Zhu, Jing Dong, Di Gu, Hong Jiang and Baohui Wang, Structural modification of isomorphous SO2-4-doped K2Fe04 for remediating the stability and enhancing the discharge of super-iron battery, Dec. 11, 2018, Royal Society Open Science, 6: 180919, http://dx.doi.org/10.1098/rsos. 180919, Apr. 26, 2022.
Chun-Chieh Chang, N. Scarr and P.N. Kumta, Synthesis and electrochemical characterization of LiMO2 (M = Ni, Ni0.75Co0.25) for rechargeable lithium ion batteries, Jun. 4, 1998, Solid State lonics, 329-344, 112 (1998).
Dae-wook Kim, Hiromasa Shiiba, Nobuyuki Zettsu, Tetsuya Yamada, Takeshi Kimijima, Gabriel Sanchez-Santolino, Ryo Ishikawa, Yuichi Ikuhara and Katsuya Teshima, Full picture discovery for mixed-fluorine anion effects on high-voltage spinel lithium nickel manganese oxide cathodes, Mar. 14, 2017, NPG Asia Materials, (2017) 9, e398, doi:10.1038/am.2017.90.
Dongming Liu, Xiajian Fan, Zeheng Li, Tong Liu, Minghao Sun, Chao Qian, Min Ling, Yunjian Liu and Chengdu Liang, A cation/anion co-doped Li1.12Na0.08Ni0.2Mn0.601.95F0.05 cathode for lithium ion batteries, Jan. 31, 2019, Nano Energy, 786-796, 58 (2019).
Fantai Kong, Chaoping Liang, Roberto C. Longo, Dong-Hee Yeon, Yongping Zheng, Jin-Hwan Park, Seok-Gwang Doo and Kyeongjae Cho, Conflicting Roles of Anion Doping on the Electrochemical Performance of Li-Ion Battery Cathode Materials, Sep. 9, 2016, Chemistry of Materials, 6942-6952, 28, 2016.
Feng Wu, Qing Xue, Li Li, Xiaoxiao Zhang, Yongxin Huang, Ersha Fan and Renjie Chen, The positive role of (NH4) 3AlF6 coating on Li [Li0.2Ni0.2MN0.6]O2 oxide as the cathode material for lithium-ion batteries, Dec 12, 2016, RSC Advances, 1191-1199, 2017, 7, 1191.
Guishan Zou, Xiukang Yang, Xianyou Wang, Long Ge, Hongbo Shu, Yansong Bai, Chun Wu, Haipeng Guo, Liang Hu, Xin Yi, Bowei Ju, Hai Hu, Di Wang and Ruizhi Yu, Improvement of electrochemical performance for Li-rich spherical Li1.3[Ni0.35Mn0.65]O2+x modified by Al2O3, Feb. 20, 2014, J Solid State Electrochem, 1789-1797, (2014) 18.
Guorong Chen, Juan An, Yiming Meng, Changzhou Yuan, Bryan Matthews, Fei Dou, Liyi Shi, Yongfeng Zhou, Pingan Song, Gang Wu and Dengsong Zhang, Cation and anion Co-doping synergy to improve structural stability of Li-and Mn-rich layered cathode materials for lithium batteries, Dec. 15, 2018, Nano Energy, 157-165, 57 (2019), https://doi.org/10.1016/j.nanoen.2018.12.049.
H. Arai, S. Okada, H. Ohtsuka, M. Ichimura and J. Yamaki, Characterization and cathode performance of Li1-xNi1 +xO2 prepared with the excess lithium method, May 1, 1995, Solid State lonics 80 (1995), 261-269.
Huan Liu, Shao-hua Luo, Sheng-xue Yan, Ya-feng Wang, Qing Wang, Ming-qi Li and Ya-hui Zhang, A novel and low-cost iron source for synthesizing C1-doped LiFePO4/C cathode materials for lithium-ion batteries, Aug. 28, 2019, Journal of Electroanalytical Chemistry, 850 (2019) 113434, https://doi.org/10.1016/j.jelecchem.2019.113434.
International Search Report and Written Opinion for PCT/US2023/018843 (ISA/EP) mailed Aug. 4, 2023 (17 pages).
Ji-Lei Shi, Ran Qi, Xu-Dong Zhang, Peng-Fei Wang, Wei-Gui Fu, Ya-Xia Yin, Jian Xu, Li-Jun Wan and Yu-Guo Guo, High-Thermal and Air-Stability Cathode Material with Concentration-Gradient Buffer for Li-Ion Batteries, Nov. 17, 2017, ACS Applied Materials & Interfaces, 42839-42835, 2017, 9.
John Mark P. Martirez and Emily A. Carter, Effects of the Aqueous Environment on the Stability and Chemistry of B-NiOOH Surfaces, Jul. 6, 2018, Chemistry of Materials, 5205-5219, 2018, 30.
Junqing Pan, Yanzhi Sun, Pingyu Wan, Zihao Wang, and Xiaoguang Liu, Synthesis, characterization and electrochemical performance of battery grade NiOOH, Jun. 20, 2005, Electrochemistry Communications, 857-862, 7 (2005).
L. F. Huang, M. J. Hutchinson, R. J. Santucci, Jr., J. R. Scully, and J.M. Rondinelli, Improved Electrochemical Phase Diagrams from Theory and Experiment: The Ni-Water System and Its Complex Compounds, Apr. 18, 2017, J. Phys. Chem C 2017, 121, 9782-9789.
Loic Baggeto, Nancy J. Dudney and Gabriel M. Veith, Surface chemistry of metal oxide coated lithium manganese nickel oxide thin film cathodes studied by XPS, Dec. 5, 2012, Electrochimica Acta, 135-147, 90 (2013).
M. Mohan Rao, M. Jayalakshmi, O. Schaf and U. Guth, Electrochemical behavior of solid lithium nickelate (LiNiO2) in an aqueous electrolyte system, May 5, 1999, J. Solid State Electrochem, 17-23, (1999) 4.
Man Huon Han, Elena Gonzalo, Montse Casa-Cabanas, Teofilo Rojo, Structural evolution and electrochemistry of monoclinic NaNiO2 upn the first cycling process, Feb. 21, 2014, Journal of Power Sources, 258 (2014) 266-271.
Mehrdad Balandeh and Sirous Asgari, Synthesis and Characterization of LiNiO2 Nanopowder with Various Chelating Agents, Mar. 27, 2010, Journal of Nanomaterials, vol. 2010, Article ID 695083, 6 pages.
Murugan Nanthagopal, P. Santhoshkumar, Nitheesha Shaji, Sekar Praveen, Hyeong Seop Kang, Chenrayan Senthil and Chang Woo Lee, Nitrogen-doped carbon-coated Li[Ni0.8Co0. 1Mn0.1]O2 cathode material for enhanced lithium-ion storage, Jun. 26, 2019, Applied Surface Science, 871-878, 492 (2019).
P. Kalyani & N. Kalaiselvi, Various aspects of LiNiO2 chemistry: A review, Sep. 6, 2005, Science and Technology of Advanced materials, https://doi.org/10.1016/j.stam.2005.06.001.
Peiyuan Guan, Lu Zhou, Zhenlu Yu, Yuandong Sun, Yunjian Liu, Feixiang Wu, Yifeng Jiang and Dewei Chu, Recent progress of surface coating on cathode materials for high-performance lithium-ion batteries, Sep. 4, 2019, Journal of Energy Chemistry, 220-235, 43 (2020).
Plousia Vassilaras, Xiaohua Ma, Xin Li, and Gerbrand Ceder, Electrochemical Properties of Monoclinic NaNi02, Nov. 29, 2012, Journal of the Electrochemical Society, 160 (2) A207-A211 (2013).
Ren-Peng Qing, Ji-Lei Shi, Dong-Dong Xiao, Xu-Dong Zhang, Ya-Xia Yin, Yun-Bo Zhai, Lin Gu and Yu-Guo Guo, Enhancing the Kinetics of Li-Rich Cathode Materials through the Pinning effects of Gradient Surface Na+ Doping, Advanced Energy Materials, 2016, 6, 1501914.
Requirement for Restriction/Election Mailed on Nov. 25, 2025 for U.S. Appl. No. 18/301,544, 8 page(s).
Ruirui Zhao, Zilian Yang, Jiaxing Liang, Dongliang Lu, Changcheng Liang, Xiongcong Guan, Aimei Gao, Hongyu Chen, Understanding the role of Na-doping on Ni-rich layered oxide LiNi0.5Co0.2Mn0.302, Jul. 22, 2016, Journal of Alloys and Compounds, 318-325, 689 (2016).
Shengli Pang, Yonggang Wang, Tao Chen, Xiangqian Shen, Xiaoming Xi and Daqian Liao, The effect of AIF3 modification on the physicochemical and electrochemical properties of Li-rich layered oxide, Dec. 23, 2015, Ceramics International, 5397-5402, 42 (2016).
Tsutomu Ohzuku, Atsushi Ueda and Masatoshi Nagayama, Electrochemistry and Structural Chemistry of LiNiO2 (R3m) for 4 Volt Secondary Lithium Cells, Jan. 6, 2026, J. Electrochemical Soc., 140, No. 7, Jul. 1993.
U. H. Kim, D. W. Jun, K. J. Park, Q. Zhang, P. Kaghazchi, D. Aurbach, D. T. Major, G. Goobes, M. Dixit, N. Leifer, C. M. Wang, P. Yan, D. Ahn, K. H. Kim, C. S. Yoon and Y. K. Sun, Pushing the

(56) References Cited

OTHER PUBLICATIONS limit of layered transition metal oxide cathodes for high-energy density rechargeable Li ion batteries, Mar. 12, 2018, Royal Society of Chemistry, Energy Environ. Sci., 1271-1279, 2018, 11, 1271.
Ya-Hui Xu, Shi-Xi Zhao, Yu-Feng Deng, Hui Deng and Ce-Wen Nan, Improved electrochemical performance of 5 V spinel LiNi0. 5Mn1.504 microspheres by F-doping and Li4SiO4 coating, Apr. 22, 2016, J Materiomics 2 (2016) 265-272.
Yan X. Wang, Ke H. Shang, Wei He, Xin P. Ai, Yu L. Cao, and Han X. Yang, Magnesium-Doped Li1.2 [Co0.13Ni0. 13Mn0.54]O2 for Lithium Battery Cathode with Enhanced Cycling Stability and Rate Capability, May 26, 2015, ACS Appl Mater Interfaces, 13014-13021, 2015, 7, Apr. 26, 2022.
Yan-Kook Sun and In-Hwan Oh, Synthesis of LiNiO2 powders by a sol-gel method, Sep. 4, 1996, Journal of Materials Science Letters, 30-32, 16 (1997).
Yang-Kook Sun, Dong-Hui Kim, Chong Seung Yoon, Seung-Taek Myung, Jai Prakash and Khalil Amine, A Novel Cathode Material with a Concentration-Gradient for High-Energy and Safe Lithium-Ion Batteries, Jan. 4, 2010, Advanced Functional Materials, 485-491, 2010, 20.
Yasunori Nishida, Kenji Nakane and Tomoari Satoh, Synthesis and properties of gallium-doped LiNiO2 as the cathode material for lithium secondary batteries, Nov. 28, 1996, Journal of Power Sources, 561-564, 68 (1997).
Yi-Chun Lu, Azzam N. Mansour, Naoaki Yabuuchi and Yang Shao-Horn, Probing the Origin of Enhanced Stability of "AIPO4" Nanoparticle Coated LiCoO2 during Cycling to High Voltages: Combined XRD and XPS Studies, Sep. 9, 2009, Chemistry of Materials, 4408-4424, 21 (2009).
Yujin Chae, Joong Kee Lee and Wongchang Choi, Surface coating of spinel LiMn204 cathode electrode with lithium- nickel-manganese-oxide by RF sputtering method for lithium-ion batteries, Jul. 30, 2014, Journal of Electroanalytical Chemistry, 20-25, 730 (2014).
Yujuan Zhao, Zhi Lv, Tao Xu and Jingxia Li, SiO2 coated Li1. 2Ni0.2Mn0.6O2 as cathode materials with rate performance, HF scavenging and thermal properties for Li-ion batteries, Apr. 30, 2017, Journal of Alloys and Compounds, 105-111, 715 (2017).
Yun Sung Lee, Yang Kook Sun and Kee Suk Nahm, Synthesis and characterization of LiNiO2 cathode material prepared by an adiphic acid-assisted sol-gel method for lithium secondary batteries, Oct. 25, 1998, Solid State lonics, 159-168, 188 (1999).
Yunjian Liu, Dongming Liu, Hong-Hui Wo, Xiaojian Fan, Aichun Dou, Qiaobao Zhang and Mingru Su, Improved Cycling Stability of Na-Doped Cathode Materials Li1.2Ni0.2Mn0.6O2 via a Facile Synthesis, ACS Sustainable Chemistry & Engineering, 12045-13055, 2018, 6, Apr. 26, 2022.
Yunjian Liu, Zhiqiang Zhang, Yanbao Fu, Qiliang Wang, Jun Pan, Mingru Su and Vincent s. Battaglia, Investigation the electrochemical performance of Li1.2Ni0.2Mn0.6O2 cathode material with ZnAl2O4 coating for lithium ion batteries, May 30, 2016, Journal of Alloys and Compounds, 523-532, 685 (2016).
Yuyang Chen, Yang Sun and Xuejie Huang, Origin of the Ni/Mn ordering in high-voltage spinel LiNi0.5Mn1.5O4: The role of oxygen vacancies and cation doping, Feb. 2, 2016, Computational Materials Science, 109-116, 115 (2016).
Zhen-Hua Liang, ying-Jie Zhu and Xian-Luo Hu, B-Nickel Hydroxide nanosheets and Their Thermal Decomposition to Nickel Oxide Nanosheets, Feb. 25, 2004, J. Phys. Chem. B, 3488-3491, 2004, 108.

* cited by examiner

Acid Desodiation/Disproportionation (Example 2):

$$2NaNiO_2+2H_2SO_4=NiO_2+NiSO_4+Na_2SO_4+2H_2O$$

- The theoretical Ni utilization=50%
- The theoretical yield (final wt/initial wt=40%)
- Actual yield 7-18%

Persulfate Desodiation/Oxidation (Example 3):

$$2NaNiO_2+Na_2S_2O_8=2NiO_2+Na_2SO_4+ Na_2SO_4$$

- The theoretical Ni utilization=100%
- The theoretical yield (final wt/initial wt=80%)
- Actual yield 83-89%

The actual observed phases after desodiation/oxidation:

- Gamma-sodium nickelate ($Na_xNiO_2(H_2O)_n$)
- Beta-NiOOH
- $NiO_2$
- minor phases

Fig. 2

SODIUM NICKELATE CATHODE MATERIAL SYNTHESIS UTILIZING PERSULFATE DESODIATION AND OXIDATION AND USES THEREOF

CROSS REFERENCE TO RELATED APPLICATION

This application claims priority from U.S. provisional application Ser. No. 63/363,059, filed Apr. 15, 2022, which is hereby incorporated by reference in its entirety for all of its teachings.

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain.

As the shape and size of the batteries are often fixed, battery manufacturers must modify cell characteristics to provide increased performance. Attempts to address the problem of how to improve a battery's performance in a particular device, such as a digital camera, have usually involved changes to the cell's internal construction. For example, cell construction has been modified by increasing the quantity of active materials utilized within the cell.

High valent nickel materials including nickel oxyhydroxide (NiOOH), nickel dioxide ($NiO_2$), and various forms of nickel oxides, nickelates, and nickel oxyhydroxides are useful as cathode materials in alkaline systems due to their high capacity and cell voltage. Particularly, the delithiated $LiNiO_2$ such as $Li_xNiO_2$ (where x<<1) has an oxidation state higher than 3+ which potentially gives a much higher discharge capacity than EMD ($MnO_2$). However, nickelate $Li_xNiO_2$ is intrinsically unstable, and it degrades rapidly in high temperatures. Furthermore, these materials are thermodynamically unstable in aqueous electrolytes, resulting in the electrochemical reduction of the nickel cathode (loss of electrode capacity). Therefore, the shelf life of alkaline batteries with high valent nickel cathodes is limited compared to batteries containing some other cathode materials.

SUMMARY OF THE INVENTION

An embodiment of the invention is a nickelate material, said nickelate material having an X-ray diffraction (XRD) pattern comprising a first peak from about 12°-14° 2Θ, a second peak from about 18°-21° 2Θ, a third peak from about 24°-25° 2Θ, and a fourth set of peaks from about 36°-43° 2Θ. In an alternate embodiment, the desodiated nickelate material has an XRD pattern having at least 1, 2, 3, or 4 of these four peaks or sets of peaks.

An embodiment is a method of preparing a persulfate-treated, desodiated and oxidized nickelate, said method comprising contacting a sodium nickelate with a persulfate solution, so as to produce the persulfate-treated, desodiated and oxidized nickelate.

An embodiment is a nickelate material prepared by any method described herein.

An embodiment is an alkaline cathode composition comprising any nickelate material described herein and electrolytic manganese dioxide (EMD).

An embodiment is an alkaline cathode composition comprising any desodiated and oxidized nickelate material described herein, electrolytic manganese dioxide, graphite, and a binder.

An embodiment is a pre-aged beta nickelate material, said pre-aged beta nickelate material having an X-ray diffraction (XRD) pattern comprising a first peak from about 50.0°-52.0° 2Θ, a second peak from about 53.6°-56.8° 2Θ, a third peak from about 60.8°-62.6° 2Θ, a fourth peak from about 66.4°-67.5° 2Θ, and a fifth peak from about 67.4°-68.6° 2Θ. In an alternate embodiment, the desodiated nickelate material has an XRD pattern having at least 1, 2, 3, 4, or 5 of these five peaks.

An embodiment is a method of preparing a pre-aged beta nickelate material, said method comprising contacting a beta nickelate with a pre-aging solution comprising a hydroxide, so as to produce the pre-aged nickelate material.

An embodiment is a beta nickelate material made by any method described herein.

An embodiment is an alkaline cathode composition comprising any beta nickelate material described herein and electrolytic manganese dioxide (EMD).

An embodiment is a composition comprising any beta nickelate material described herein, electrolytic manganese dioxide, graphite, and a binder.

An embodiment is an alkaline electrochemical cell comprising any nickelate material or composition described herein.

BRIEF SUMMARY OF THE DRAWINGS

FIG. 2 displays the yields and chemical reactions for acid desodiation/disproportionation and persulfate desodiation/oxidation.

DETAILED DESCRIPTION

Figure 1:
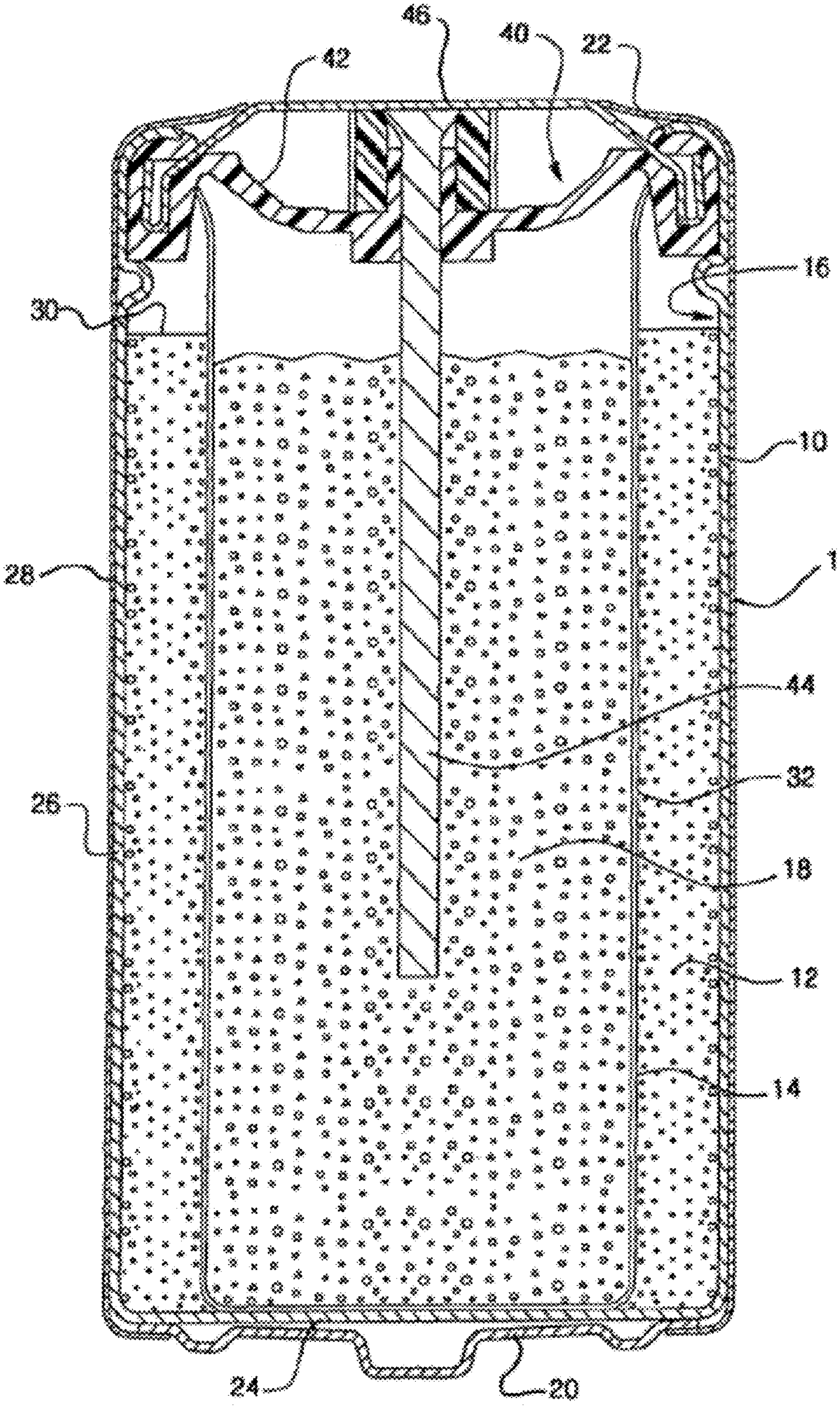
FIG. 1 is a cross-sectional elevation view of an alkaline electrochemical of an embodiment.

Various embodiments now will be described more fully hereinafter with reference to the accompanying drawing, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

It was in an effort to overcome the limitations of the existing electrochemical cells that the present embodiments were designed. Typically, $Na_xNiO_2$ resulting from acid leached $NaNiO_2$ has a lower yield and lower chemical stability than acid delithiated $Li_xNiO_2$. An oxidation/desodiation process is disclosed which results in a sodium nickelate material wither improved chemical stability at high temperatures and a higher nickelate material yield from the oxidation/desodiation process than the commonly used acid leaching process.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%.

As used herein, "about" in the context of a numerical value or range means within +10%, ±5%, or ±1% of the numerical value or range recited or claimed.

As used herein, "nickelate" refers to a salt containing an anion which contains nickel, or a compound comprising nickel bound to oxygen and at least one other element.

As used herein, "nickel compound" refers to any compound comprising nickel.

As used herein, "nickel precursor" refers to a compound comprising nickel that is reacted with a sodium-containing compound in order to produce a different compound comprising nickel.

As used herein, "oxide" refers to a chemical compound that contains at least one oxygen atom and one other element. As used herein, "nickel oxide" refers to any nickel-containing oxide. Nickel oxides may comprise other cations and anions. Non-limiting examples include nickel dioxide ($NiO_2$), nickel hydroxide ($Ni(OH)_2$), and hydrated alkali nickel oxide such as $Na_xNiO_2 \cdot n(H_2O)$.

As used herein, "oxyhydroxide" refers to a chemical compound or complex containing an oxide group and a hydroxide group. As used herein, "nickel oxyhydroxide" refers to any nickel-containing oxyhydroxide. Nickel oxyhydroxides may comprise other cations and anions. A non-limiting example is nickel oxyhydroxide (NiOOH).

As used herein, "persulfate" refers to any compound comprising a persulfate anion (either $SO_5^{2-}$ or $S_2O_8^{2-}$. Non-limiting examples include sodium persulfate ($NaS_2O_8$), ammonium persulfate $(NH_4)_2S_2O_8$, and potassium persulfate ($K_2S_2O_8$).

As used herein, "sodium compound" refers to any compound comprising sodium. In an embodiment, the sodium compound comprises both sodium and oxygen. Non-limiting examples include NaOH (sodium hydroxide), $Na_2O$ (sodium oxide), $NaO_2$ (sodium peroxide), and $Na_xNiO_2$ (sodium nickel oxide).

As used herein, "improvement" with respect to storage stability means that the storage stability (i.e. "shelf-life") is increased. Generally, an"improvement" of a property or metric of performance of a material or electrochemical cell means that the property or metric of performance differs (compared to that of a different material or electrochemical cell) in a manner that a user or manufacturer of the material or cell would find desirable (i.e. costs less, lasts longer, provides more power, more durable, easier or faster to manufacture, etc.).

As used herein, an "alkali metal" is an element from Group IA of the periodic table. Non-limiting examples include Li, Na, K, Rb, and Cs.

As used herein, an "alkaline earth metal" is an element from Group IIA of the periodic table. Non-limiting examples include Mg, Ca, and Sr.

As used herein, a "transition metal" is an element from Groups IB-VIIIB of the periodic table. Non-limiting examples include Co, Mn, Zn, Y, Nb, and Ti.

As used herein, "other metals" or "another metal" includes all metals on the periodic table not included in the previously mentioned Groups, including Al, Ga, In, Sn, Tl, Pb, and Bi.

As used herein, a "primary" electrochemical cell is a non-rechargeable (i.e., disposable) electrochemical cell. A "secondary" electrochemical cell is a rechargeable electrochemical cell.

As used herein, "conductivity" refers to a given material's ability to conduct electric current. This is typically measured in Siemens per meter (S/m).

As used here, the term "pre-aging" or "pre-aged" refers to a controlled process to convert the material to a more stable resulting phase or a mixture of different phases over time when utilized in a final product. For example, a cathode material may be pre-aged using processes as discussed herein to provide a more shelf-stable cathode material when included within a battery. In certain embodiments, nickelate oxide is pre-aged by exposing the material to LiOH, NaOH, KOH, and/or other oxides or hydroxides of a specific concentration, at a specific temperature and a specified time period. The other hypothesis is that pre-aging could also form a protective film on the surface of the high oxidation state of nickel particles to slow down the decomposition reactions from high to low nickel oxidation state.

An embodiment is a nickelate material, said nickelate material having an X-ray diffraction (XRD) pattern comprising a first peak from about 12°-14° 2Θ, a second peak from about 18°-21° 2Θ, a third peak from about 24°-25° 2Θ, and a fourth set of peaks from about 36°-43° 2Θ. In an alternate embodiment, the desodiated nickelate material has an XRD pattern having at least 1, 2, 3, or 4 of these four peaks or sets of peaks.

In an embodiment, said nickelate material is a desodiated and oxidized sodium nickelate material.

In an embodiment, said desodiated and oxidized nickelate material is a desodiated nickelate hydride comprising the following phases:

i) a sodium nickel oxide having the formula ($Na_xNiO_2 \cdot nH_2O$) in an amount of 40-90 wt %, wherein $0.2 \leq x < 1$ and $0 < n < 2$;
ii) nickel oxide ($NiO_2$) in an amount of 5-40 wt %; and
iii) beta-nickel hydroxide (NiOOH) in an amount of 5-20 wt %.

An embodiment is a method of preparing a persulfate-treated, desodiated and oxidized nickelate, said method comprising contacting a sodium nickelate with a persulfate solution, so as to produce the persulfate-treated, desodiated and oxidized nickelate.

In an embodiment, said persulfate desodiated and oxidized nickelate is a mix of nickel oxide, a sodium nickel oxide hydrate, and/or a nickel oxide hydroxide.

In an embodiment, said persulfate-treated, desodiated and oxidized nickelate comprises the following phases:

i) a sodium nickel oxide having the formula ($Na_xNiO_2 \cdot nH_2O$) in an amount of 40-90 wt %, wherein $0.2 \leq x < 1$ and $0 < n < 2$;
ii) nickel oxide ($NiO_2$) in an amount of 5-40 wt %; and
iii) beta-nickel hydroxide (NiOOH) in an amount of 5-20 wt %.

This is a mixed-phase nickelate. In an embodiment, x is at least, at most, or about 0.3, 0.4, 0.5, 0.6, 0.7, 0.8, 0.9, or 1, or within a range defined by any two of these values. In an embodiment, n is at least, at most, or about 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2, or within a range defined by any two of these values. In an embodiment, the molar ratio of persulfate to nickel is from about 2-4. In an embodiment, the molar ratio is at least, at most, or about 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, or 4, or within a range defined by any two of these values.

In an embodiment, the sodium nickelate is contacted with a persulfate solution for a period of time from about 1-72 hours. In an embodiment, the period of time is at least, at most, or about 1, 2, 4, 8, 12, 16, 20, 24, 30, 36, 42, 48, 54, 60, 66, or 72 hours, or within a range defined by any two of these values.

In an embodiment, the method is performed at a temperature of less than or equal to 50° C. In an embodiment, the temperature is at least, at most, or about 0, 5, 10, 15, 20, 25, 30, 35, 40, 45, or 50° C., or within a range defined by any two of these values.

In an embodiment, the pH of the persulfate solution is from about 12-14. In an embodiment, the pH of the persulfate solution is at least, at most, or about 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, or 14, or within a range defined by any two of these values.

In an embodiment, the persulfate solution comprises a persulfate selected from the group consisting of potassium persulfate and sodium persulfate. In an embodiment, the persulfate is potassium persulfate. In an embodiment, the persulfate is sodium persulfate.

An embodiment is a nickelate material prepared by any method described herein.

An embodiment is an alkaline cathode composition comprising any nickelate material described herein and electrolytic manganese dioxide (EMD).

In an embodiment, the ratio of nickel to manganese is from about 99:1 to 1:99 by weight. In an embodiment, the ratio of nickel to manganese is at least, at most, or about 99:1, 95:5, 90:10, 80:20, 70:30, 60:40, 50:50, 40:60, 30:70, 20:80, 10:90, 5:95, or 1:99, or within a range defined by any two of these values.

An embodiment is an alkaline cathode composition comprising any desodiated and oxidized nickelate material described herein, electrolytic manganese dioxide, graphite, and a binder.

In an embodiment, the desodiated and oxidized nickelate material is present in an amount of about 8.8-45.1 wt. %, the electrolytic manganese dioxide (EMD) is present in an amount of about 48-84.3 wt. %, the graphite is present in an amount of about 3-8 wt. %, and the binder is present in an amount of about 0.1-1.0 wt. %, relative to the total weight of the nickelate, EMD, graphite, and binder. In an embodiment, the nickelate is present in an amount of at least, at most, or about 8.8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, or 45.1 wt. %, or within a range defined by any two of these values.

In an embodiment, the EMD is present in an amount of at least, at most, or about 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 84.3 wt. %, or within a range defined by any two of these values. In an embodiment, the graphite is present in an amount of at least, at most, or about 3, 4, 5, 6, 7, or 8 wt. %, or within a range defined by any two of these values. In an embodiment, the binder is present in an amount of at least, at most, or about 0.1, 0.2, 0.3, 0.4, 0.5, 0.6, 0.7, 0.8, 0.9, or 1.0 wt. %, or within a range defined by any two of these values.

In an embodiment, desodiated and oxidized nickelate material and EMD, together, are present in an amount of about 92-97 wt. %, the graphite is present in an amount of about 3-8 wt. %, and the binder is present in an amount of about 0.1-1.0 wt. %. In an embodiment, the desodiated and oxidized nickelate material and EMD, together, are present in an amount of at least, at most, or about 92, 93, 94, 95, 96, or 97 wt. %, or within a range defined by any two of these values. In an embodiment, the graphite is present in an amount of at least, at most, or about 3, 4, 5, 6, 7, or 8 wt. %, or within a range defined by any two of these values. In an embodiment, the binder is present in an amount of at least, at most, or binder is present in an amount of at least, at most, or about 0.1, 0.2, 0.3, 0.4, 0.5, 0.6, 0.7, 0.8, 0.9, or 1.0 wt. %, or within a range defined by any two of these values.

An embodiment is a pre-aged beta nickelate material, said pre-aged beta nickelate material having an X-ray diffraction (XRD) pattern comprising a first peak from about 50.0°-52.0° 2Θ, a second peak from about 53.6°-56.8° 2Θ, a third peak from about 60.8°-62.6° 2Θ, a fourth peak from about 66.4°-67.5° 2Θ, and a fifth peak from about 67.4°-68.6° 2Θ. In an alternate embodiment, the desodiated nickelate material has an XRD pattern having at least 1, 2, 3, 4, or 5 of these five peaks.

In an embodiment, the pre-aged beta nickelate material has been prepared by pre-aging a beta nickelate using a pre-aging solution comprising a hydroxide.

In an embodiment, the hydroxide is selected from the group consisting of alkali and alkaline earth metal hydroxides. In an embodiment, the hydroxide is selected from the group consisting of LiOH, NaOH, KOH, and $Ca(OH)_2$. In an embodiment, the hydroxide is LiOH, NaOH, or KOH. In an embodiment, the hydroxide is LiOH. In an embodiment, the hydroxide is NaOH. In an embodiment, the hydroxide is KOH.

In an embodiment, the hydroxide concentration of said pre-aging solution is about 0.005 M to about 1 M. In an embodiment, the hydroxide concentration is at least, at most, or about 0.005, 0.01, 0.02, 0.05, 0.1, 0.2, 0.3, 0.4, 0.5, 0.6, 0.7, 0.8, 0.9, or 1.0 M, or within a range defined by any two of these values.

In an embodiment, the pre-aging solution to beta nickelate ratio was from about 1 mL/g to about 200 mL/g. In an embodiment, the ratio was at least, at most, or about 1, 2, 5, 10, 20, 30, 40, 50, 60, 70, 80, 90, 100, 110, 120, 130, 140, 150, 160, 170, 180, 190, or 200 mL/g, or within a range defined by any two of these values.

In an embodiment, said beta nickelate was pre-aged for about 1-60 minutes. In an embodiment, the beta nickelate precursor was pre-aged for about 1-30 minutes, or about 1-20 minutes. In an embodiment, the beta nickelate was pre-aged for at least, at most, or about 1, 2, 5, 10, 15, 20, 25, 30, 35, 40, 45, 50, 55, or 60 minutes, or within a range defined by any two of these values.

In an embodiment, said beta nickelate was pre-aged at a temperature between about 0° C. to about 40° C. In an embodiment, said beta nickelate was pre-aged at a temperature of at least, at most, or about 0, 5, 10, 15, 20, 25, 30, 35, or 40° C., or within a range defined by any two of these values.

In an embodiment, said pre-aged beta nickelate comprises a beta nickelate, nickel oxide, beta nickel oxyhydroxide, or a combination thereof.

An embodiment is a method of preparing a pre-aged beta nickelate material, said method comprising contacting a beta nickelate with a pre-aging solution comprising a hydroxide, so as to produce the pre-aged nickelate material.

In an embodiment, the hydroxide is selected from the group consisting of alkali and alkaline earth metal hydroxides. In an embodiment, the hydroxide is selected from the group consisting of LiOH, NaOH, KOH, and $Ca(OH)_2$. In an embodiment, the hydroxide is LiOH, NaOH, or KOH. In an embodiment, the hydroxide is LiOH. In an embodiment, the hydroxide is NaOH. In an embodiment, the hydroxide is KOH.

In an embodiment, the hydroxide concentration of said pre-aging solution is about 0.005 M to about 1 M. In an embodiment, the hydroxide concentration is at least, at most, or about 0.005, 0.01, 0.02, 0.05, 0.1, 0.2, 0.3, 0.4, 0.5, 0.6, 0.7, 0.8, 0.9, or 1.0 M, or within a range defined by any two of these values.

In an embodiment, the pre-aging solution to beta nickelate ratio was from about 1 mL/g to about 200 mL/g. In an embodiment, the ratio was at least, at most, or about 1, 2, 5, 10, 20, 30, 40, 50, 60, 70, 80, 90, 100, 110, 120, 130, 140, 150, 160, 170, 180, 190, or 200 mL/g, or within a range defined by any two of these values.

In an embodiment, said beta nickelate was pre-aged for about 1-60 minutes. In an embodiment, the beta nickelate precursor was pre-aged for about 1-30 minutes, or about 1-20 minutes. In an embodiment, the beta nickelate was pre-aged for at least, at most, or about 1, 2, 5, 10, 15, 20, 25, 30, 35, 40, 45, 50, 55, or 60 minutes, or within a range defined by any two of these values.

In an embodiment, the temperature is between about 0° C. to about 40° C. In an embodiment, the temperature is at least, at most, or about 0, 5, 10, 15, 20, 25, 30, 35, or 40° C., or within a range defined by any two of these values.

An embodiment is a beta nickelate material made by any method described herein.

An embodiment is an alkaline cathode composition comprising any beta nickelate material described herein and electrolytic manganese dioxide (EMD).

In an embodiment, the ratio of nickel to manganese is from about 99:1 to 1:99 by weight. In an embodiment, the ratio of nickel to manganese is at least, at most, or about 99:1, 95:5, 90:10, 80:20, 70:30, 60:40, 50:50, 40:60, 30:70, 20:80, 10:90, 5:95, or 1:99, or within a range defined by any two of these values.

An embodiment is a composition comprising any beta nickelate material described herein, electrolytic manganese dioxide, graphite, and a binder.

In an embodiment, the nickel from the beta nickelate material is present in an amount of about 8.8-45.1 wt. %, the electrolytic manganese dioxide is present in an amount of about 48-84.3 wt. %, the graphite is present in an amount of about 3-8 wt. %, and the binder is present in an amount of about 0.1-1.0 wt. %, relative to the total weight of the nickelate, EMD, graphite, and binder. In an embodiment, the nickel is present in an amount of at least, at most, or about 8.8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, or 45.1 wt. %, or within a range defined by any two of these values.

In an embodiment, the EMD is present in an amount of at least, at most, or about 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 84.3 wt. %, or within a range defined by any two of these values. In an embodiment, the graphite is present in an amount of at least, at most, or about 3, 4, 5, 6, 7, or 8 wt. %, or within a range defined by any two of these values. In an embodiment, the binder is present in an amount of at least, at most, or about 0.1, 0.2, 0.3, 0.4, 0.5, 0.6, 0.7, 0.8, 0.9, or 1.0 wt. %, or within a range defined by any two of these values.

In an embodiment, the beta nickelate material and EMD, together, are present in an amount of about 92-97 wt. %, the graphite is present in an amount of about 3-8 wt. %, and the binder is present in an amount of about 0.1-1.0 wt. %. In an embodiment, desodiated and oxidized nickelate material and EMD, together, are present in an amount of at least, at most, or about 92, 93, 94, 95, 96, or 97 wt. %, or within a range defined by any two of these values. In an embodiment, the graphite is present in an amount of at least, at most, or about 3, 4, 5, 6, 7, or 8 wt. %, or within a range defined by any two of these values. In an embodiment, the binder is present in an amount of at least, at most, or binder is present in an amount of at least, at most, or about 0.1, 0.2, 0.3, 0.4, 0.5, 0.6, 0.7, 0.8, 0.9, or 1.0 wt. %, or within a range defined by any two of these values.

In an embodiment, any nickelate material described herein is a nickelate cathode material.

An embodiment is an alkaline electrochemical cell comprising any nickelate material or composition described herein.

The embodiments will be better understood by reference to FIG. 1 which shows a cylindrical cell 1 in elevational cross-section, with the cell having a nail-type or bobbin-type construction and dimensions comparable to a conventional LR6 (AA) size alkaline cell, which is particularly well-suited to the embodiments. However, it is to be understood that cells according to the embodiments can have other sizes and shapes, such as a prismatic or button-type shape; and other electrode configurations, as known in the art. The materials and designs for the components of the electrochemical cell illustrated in FIG. 1 are for the purposes of illustration, and other materials and designs may be substituted. Moreover, in certain embodiments, the cathode and anode materials may be coated onto a surface of a separator and/or current collector and rolled to form a "jelly roll" configuration.

In FIG. 1, an electrochemical cell 1 is shown, including a container or can 10 having a closed bottom end 24, a top end 22 and sidewall 26 there between. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, solid zinc oxide, and a surfactant. The negative electrode can optionally include other additives, for example a binder or a gelling agent, and the like.

Zinc is an example main active material for the negative electrode of the embodiments. Mercury and magnesium may also be used. Preferably, the volume of active material utilized in the negative electrode is sufficient to maintain a desired particle-to-particle contact and a desired anode to cathode (A:C) ratio.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

The aqueous alkaline electrolyte may comprise an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 26 to about 36 weight percent, for example from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred but can lead to rapid electrolyte separation of the anode. Increase of alkaline metal hydroxide concentration creates a more stable anode but can reduce DSC service.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount of gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 $m^2/g$ or less measured utilizing a Tristar 3000 BET specific surface area analyzer from Micrometrics having a multi-point calibration after the zinc oxide has been degassed for one hour at 150° C.; and a particle size D50 (median diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

Second electrode 12, also referred to herein as the positive electrode or cathode, has a nickelate compound (or "nickelate cathode material") as its electrochemically active material. The active material is present in an amount generally from about 80 to about 98 weight percent and preferably from about 81 to 97 weight percent based on the total weight of the positive electrode, i.e., nickelate cathode material, binder, conductive material, positive electrode electrolyte, and additives, if present.

The active cathode material may be a blend of a nickelate cathode material and other active materials such as electrolytic manganese dioxide (EMD), chemical manganese dioxide (CMD), copper oxide, and others. The weight percentage of the nickel-containing compound could be in the range of 5% to 100% of the total active cathode material. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed (known as impact molding). Second electrode 12 has a ledge 30 and an interior surface 32 as illustrated in FIG. 1. Alternatively, the positive electrode may be formed by preforming a plurality of rings from the mixture comprising the nickelate cathode material, and then inserting the rings into the container to form the tubular-shaped second electrode (known as ring molding). The cell shown in FIG. 1 would typically include 3 or 4 rings.

The active material may be in the form of particles having any size suitable for use in an electrode mixture. In an embodiment, the active material is in the form of particles having an average size of approximately 1-20 microns, or 1-10 microns, or 1-5 microns, or 7-10 microns. In an embodiment, the active material is in the form of particles having a size ranging from 0.1-40 microns.

The cathode also comprises a binder, which may be any binder known in the art. Non-limiting examples of binders include polyvinylidene fluoride (PVDF), polyethylene, copolymers based on polystyrene and ethylene/propylene, such as those available under the Kraton® trade name, sold by Kraton Corporation (Houston, TX), polytetrafluoroethene (PTFE), poly(3,4-ethylenedioxythiophene) (PEDOT) copolymers, polystyrene sulfonate (PSS), and PEDOT:PSS polymer mixtures. The binder may be in the form of particles having any size suitable for use in an electrode mixture.

The cathode also comprises a conductive material, which may be a conductive carbon. The conductive carbon may be graphite, and the graphite may be expanded graphite. The graphite may be in the form of particles having any size suitable for use in an electrode mixture. In an embodiment, the graphite is in the form of particles having an average size ranging from nanoparticle-sized to 65 microns. In an embodiment, the maximum size of the graphite particles is 110 microns.

An example of an additional cathode additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as Coathylene® (Axalta Coating Systems, Glen Mills, PA), and calcium stearate.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $MnO_2$ in the positive electrode or cathode, the A:C ratio may be greater than 1.1:1, such as greater than 1.2:1, and specifically 1.3:1 for impact molded positive electrodes. The A:C ratio for ring molded positive electrodes can be about 1.3:1 to about 1.1:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

All of the references cited above, as well as all patent, patent publication, and non-patent literature references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

DISCUSSION AND EXAMPLES

Example 1: $NaNiO_2$ Synthesis

Figure 3:
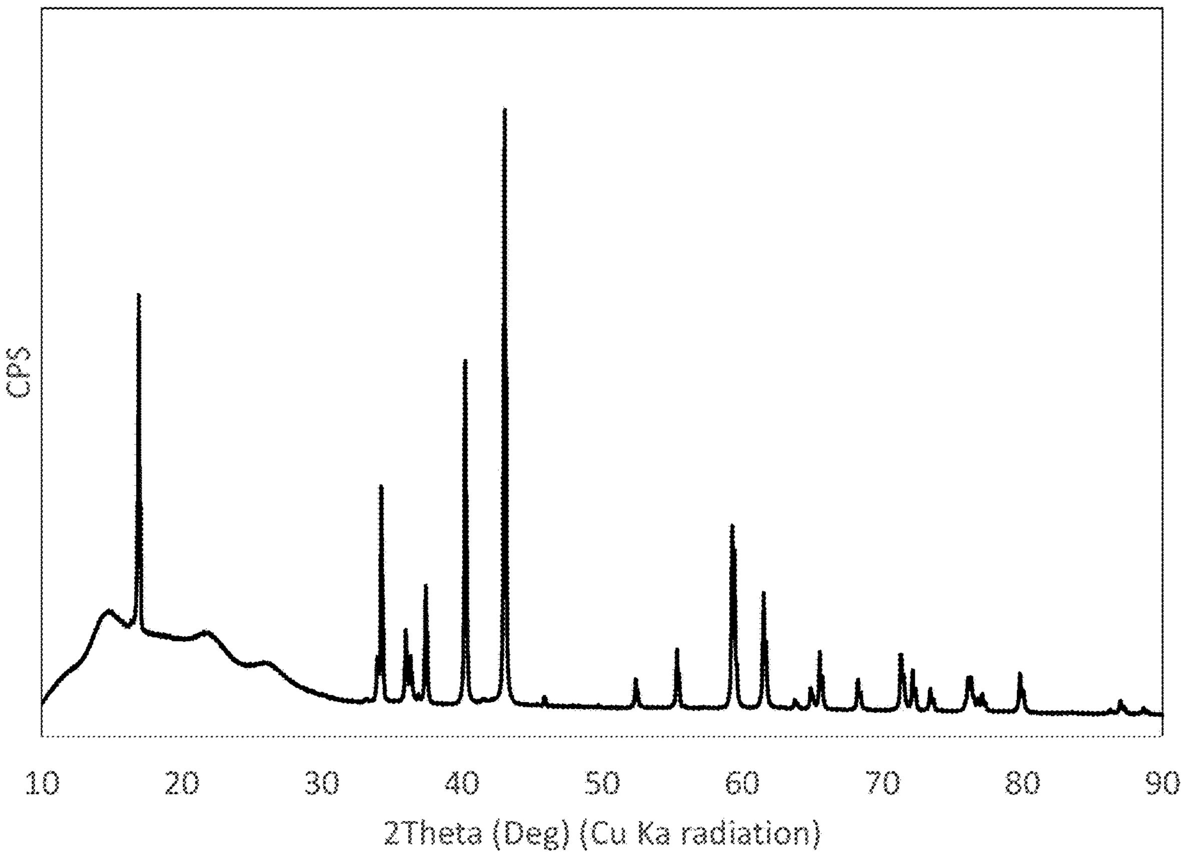
FIG. 3 shows the X-ray diffraction (XRD) pattern for Sodium Nickel Oxide.

Poured granular $Na_2O_2$ ordered from Sigma Aldrich into a Spex mill vial until ⅓ of the way full. Pre-milled the material for 30 min to reduce the particle size. Weighed a desired quantity of $Ni(OH)_2$ into a crucible and covered the crucible with a lid. Heated the $Ni(OH)_2$ in a furnace at 650° C. for 6 hr to convert to NiO which was verified with XRD. Weighed out 13.1 g converted NiO into a Spex mill vessel and added 9.3 g pre-milled $Na_2O_2$. Sealed the Spex mill vessel with tape and milled for 5 min. Transferred the milled reagent mixture to a crucible with lid; and heated at 680° C. in air or oxygen for 30 hr. Milled the final product for 10 min on the Spex mill if needed. It is necessary to handle the final product in an argon glove box since the samples is sensitive to moisture in the air. The material synthesized was analyzed with D-8 Advance X-ray diffractometer for the powder XRD pattern, and the identified phase is mainly $NaNiO_2$ as shown in FIG. 3.

Figure 4:
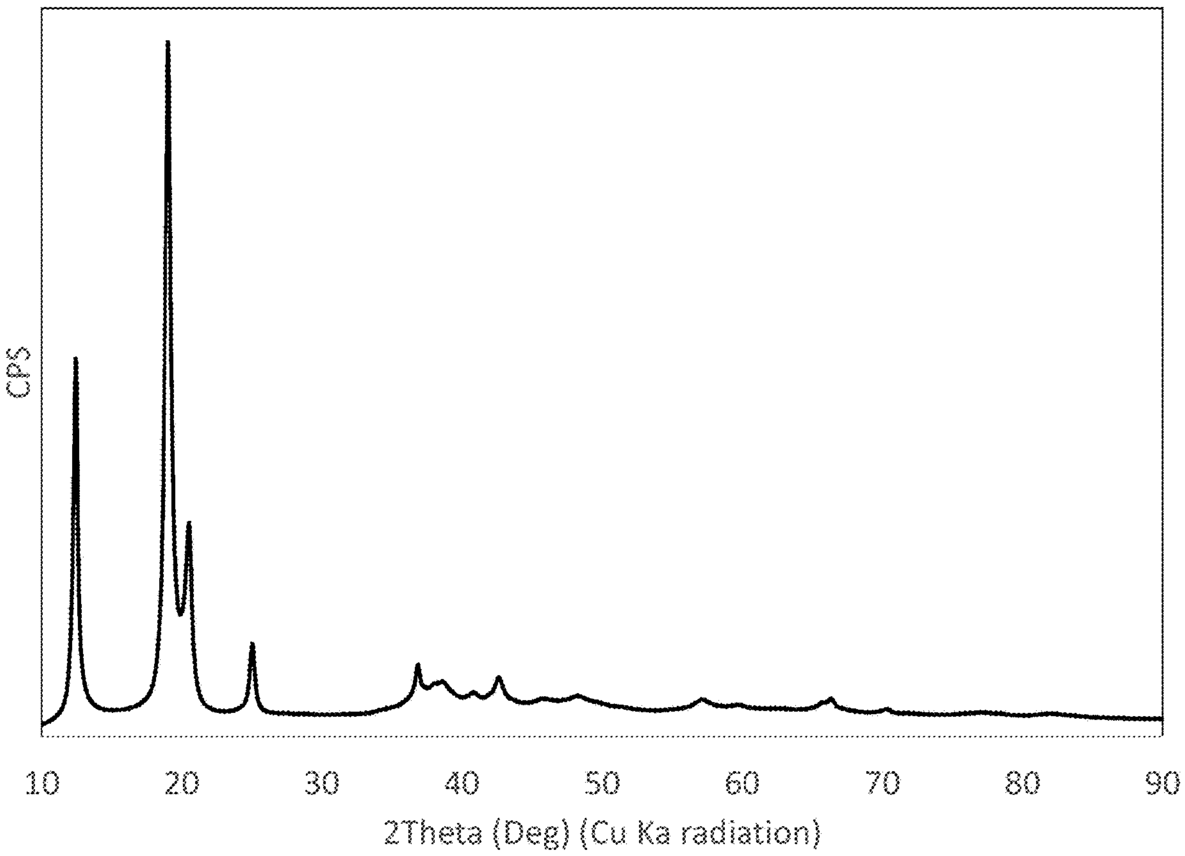
FIG. 4 shows the X-ray diffraction (XRD) pattern for desodiated Sodium Nickel Oxide.

Example 2: Desodiation/Disproportionation by Acid Leaching 17.4 g sample from Example 1 was leached with a concentrated sulfuric acid to remove the sodium (desodiation). After acid leaching, the sample was filtered and washed through a filtration paper with DI water until the pH of the filtrate matched that of DI water. Dried the powder at 71° C. overnight. The final weight of the dried sample is 2.2 g so that the calculated yield is about 13%. The dried power was identified by XRD as a compound with mixed phases of sodium nickel oxide hydride ($Na_{0.33}NiO_20.5(H_2O)$, PDF 04-015-9998), nickel oxyhydroxide (beta-NiOOH, PDF 04-016-9895), and nickel oxide ($NiO_2$, PDF 04-010-4751) as shown in FIG. 4.

Example 3: Desodiation and Oxidation with Persulfate

Figure 5:
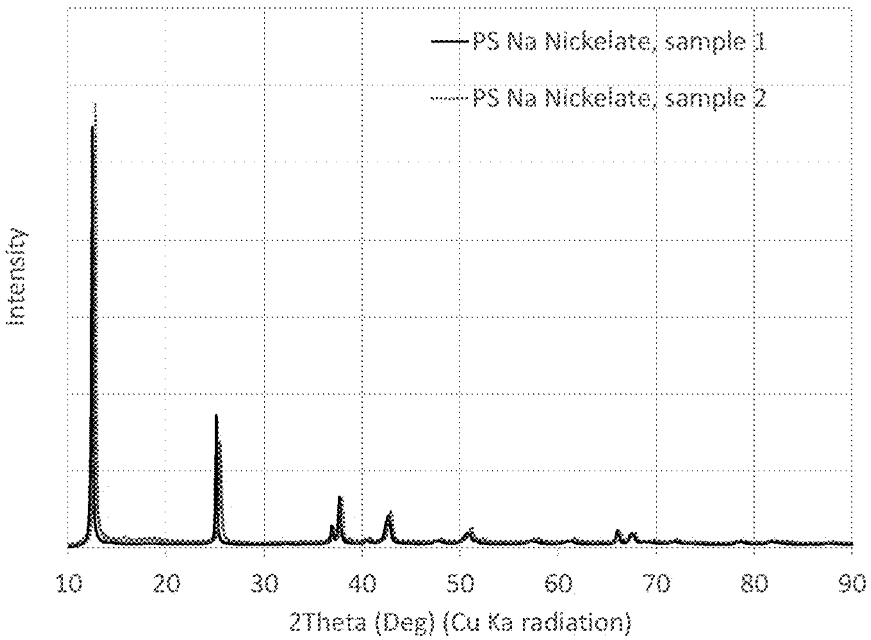
FIG. 5 shows the X-ray diffraction (XRD) pattern for desodiated and oxidized Sodium Nickel Oxide with Persulfate.

Added 100 mL deionized (DI) water to a 250 mL beaker. Slowly added 43.2 g $Na_2S_2O_8$ purchased from GFS Chemical to a beaker of DI water stirred with a magnet bar. Continuously stirred the solution until it was clear. Slowly added 1.58 g 50 wt % NaOH and stirred for 1 hr. Very slowly added 9.0 g $NaNiO_2$ synthesized in Example 1 to the solution in a vent hood since the reaction is exothermic and adding powder too quickly could result in bubbling over (the resulting sodium persulfate to sodium nickel oxide molar ratio is 2.3). When powder addition was done, moved the beaker with the stirring set to a Thermotron oven, and ramped up the temperature to 40° C. Continuously stirred the solution for 20 hr at 40° C. Turned off the Thermotron and allowed the powder to settle for 15-30 min until the powder was settled. Filtered and washed the powder through a filtration paper with DI water until the pH of the filtrate matched that of DI water. Dried the powder at 71° C. overnight. The final weight of the dried sample is 7.2 g resulting in a yield of 80% which is much higher than that in Example 2 (13%). The dried powder was identified by XRD as sodium nickel oxide hydride ($Na_{0.33}NiO_20.5(H_2O)$, PDF 04-015-9998) as shown in FIG. 5. The 2theta of Sample 2 in FIG. 5 was intentionally shifted right by 0.3 Deg for better visualization.

Example 4: Alpha Nickelate $Li_xNiO_2$ Synthesis

Lithium nickel oxide ($LiNiO_2$) precursor was prepared and delithiated by acid leaching in a sulfuric acid solution (H. Arai and Y. Sakurai, J. Power Sources, 81-82 (1999) 401-405). The XRD pattern shows that the delithiated product is an alpha lithium nickel oxide (($Li_{0.09}Ni_{0.01}$)($NiO_2$), PDF 01-085-1976), and the composition is $Li_{0.104}NiO_2$ based on inductively coupled plasma atomic emission spectroscopy (ICP-AES).

Figure 6:
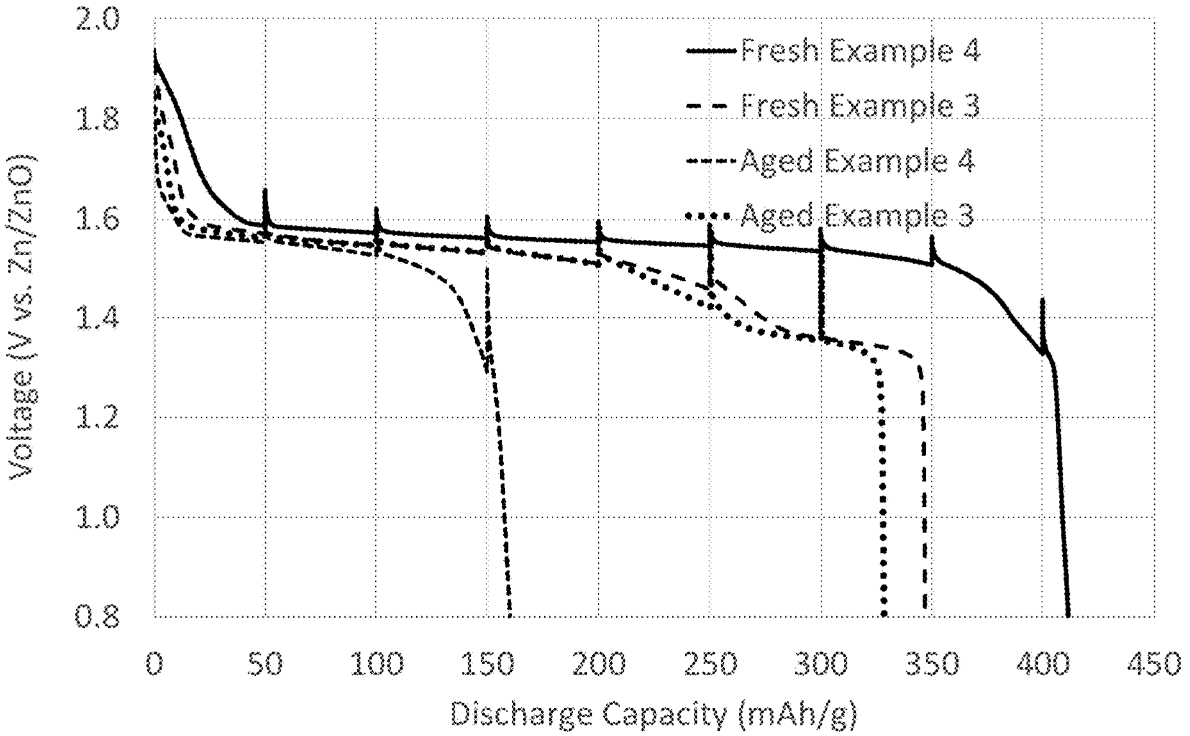
FIG. 6 shows the discharge capacity (10 mA/g) before and after the dry powder was aged in 70° C./50% RH for 4 weeks.

Example 5: Half-Cell Testing on Samples Both Fresh and Aged at 70° C. with 50% RH for 4 Weeks Some samples of dry powder from both Examples 3 and 4 were aged at 70° C. with 50% relative humidity (RH) for 4 weeks. Then both fresh and aged samples from Examples 3 and 4 were discharged in a half-cell testing apparatus to determine the electrochemical discharge capacity as the following: 49 wt % of the active material was mixed with 49% SFG 15 graphite and 2% coathylene binder to form a cathode mix. 200 mg of the cathode mix was pressed into a 357-button cell can with a force of 5,000 lbf. The button cell was placed into an acrylic plastic testing fixture filled with 40 wt % KOH with 6 wt % ZnO; and discharged at 10 mA/g rate with 1 hr rest for every 5 hr discharge to observe voltage recovery. The discharge rate is based on the active material. FIG. 6 shows the discharge curves of the material. From the figure it can be seen that the alpha nickelate in Example 4 has a higher fresh capacity (409 mAh/g at 1.0 V) cutoff voltage than that in Example 3 (sodium nickel oxyhydroxide $Na_{0.33}NiO_20.5(H_2O)$ (347 mAh/g)). However, the discharge capacity of the alpha nickelate material in Example 4 was drastically reduced to 157 mAh/g after the sample was aged in 70° C. with 50% RH for 4 weeks. Under the same aging conditions, the discharge capacity of the sodium nickel oxide hydride material from Example 3 was only slightly reduced to 327 mAh/g at 1.0 V. Therefore, the sodium nickel oxide hydride sample from Example 3 is more chemically stable than the alpha nickelate from Example 4 in addition to its high yield.

Example 6: Beta-Nickelate Synthesis

The beta nickelate was synthesized based on the method described in U.S. Pat. No. 10,910,647B2 as follows. Mixed 8.6 g finely ground $LiOH{\cdot}H_2O$ and 20.9 g $Ni(OH)_2$ using a ball mill. Transferred the mix into an alumina boat. Heated the furnace from room temperature to 800° C. at the rate of 5° C./min under $O_2$ flow and kept at 800° C. for 60 hr. Removed the materials from furnace after cooling and Spex milled for 6 mins. Then the synthesized $LiNiO_2$ powder was delithiated with 6 M $H_2SO_4$ with an electrolyte to powder weight ratio 20:1 at temperature 1~4° C. for 20 hr with a continuous stirring. Washed the delithiated solids with deionized (DI) water until the supernatant was close to neutral (pH 6-7). Collected the solid by vacuum filtration and dried the material at 60° C. overnight. To convert the material into beta-nickelate, the powder was treated with 36 wt % KOH solution with a powder to solution ratio of 3:1 by weight for 24 hr at room temperature. Then the solid was washed with DI water and filtered until the filtrate was neutral. The collected solid was dried at 71° C. for overnight. The final material was confirmed as beta nickelate based on the XRD spectrum in U.S. Pat. No. 10,910,647B2.

Example 7: LiOH Preaged Beta-Nickelate

It has been shown that beta-nickelate has an increased stability in concentrated KOH electrolytes compared with alpha nickelate (U.S. Pat. No. 9,793,542B2). However, the stability of beta-nickelate is still inferior to the conventional alkaline cathode material electrolytic manganese dioxide (EMD). In this application, we have demonstrated that the stability of beta-nickelate has been improved with LiOH preaging as the follows: Measured out 40 mL 1 M LiOH electrolyte; and added the LiOH solution to the vial containing 4 g nickelate powder and swirled the vial to ensure all the powder was coated. Let it sit for 1 minute, then poured the contents of the vial into a filter funnel, used DI water to transfer any remaining solids, and washed the product with DI water until the filtrate pH equal to 10. Once the filtration was complete, placed the solid product into a 71° C. oven dry for overnight.

Figure 7:
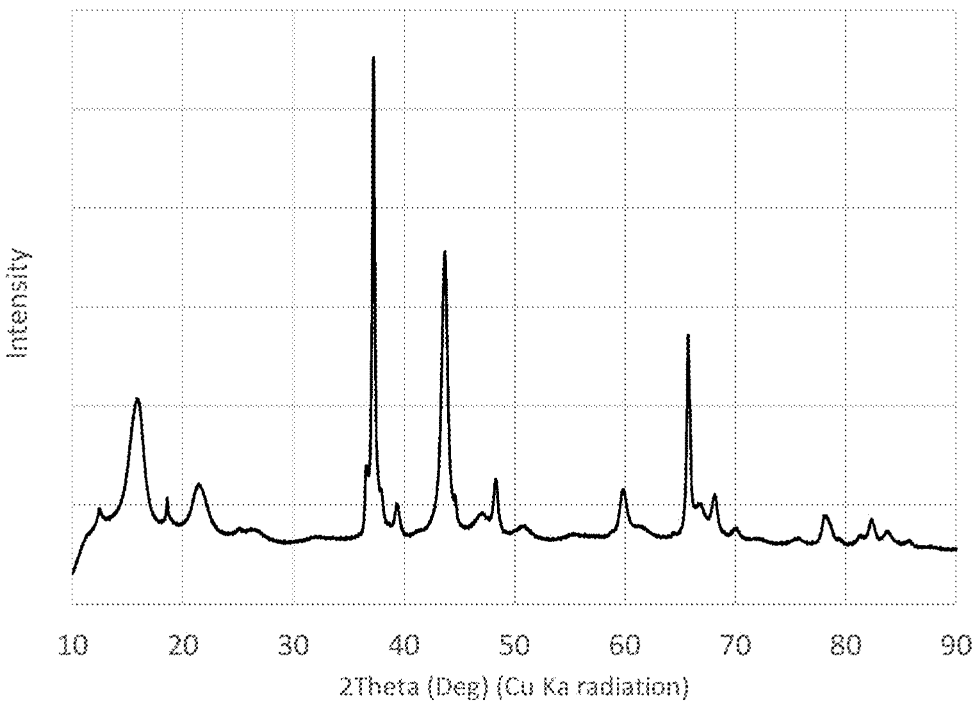
FIG. 7 shows the X-ray diffraction (XRD) pattern for LiOH-preaged beta-Nickelate.

There are a few additional characteristic peaks in the XRD spectrum of the beta nickelate after preaging beyond beta nickelate around 50.0-52.0, 53.6-56.8, 60.8-62.6, 66.4-67.5 and 67.4-68.6° 2theta as shown in FIG. 7; and these peaks are related to lithium and sodium nickel oxide compounds in the general form of $M_xNi_{1+y}O_2 \cdot nH_2O$, where M=Li or Na, $0<x<1$, $0<y<0.2$, $0 \leq n \leq 1$.

Example 8: Half-Cell Testing Comparison Between Preaged and Non-Preaged Beta-Nickelate with O/C Ratio=1

Figure 8:
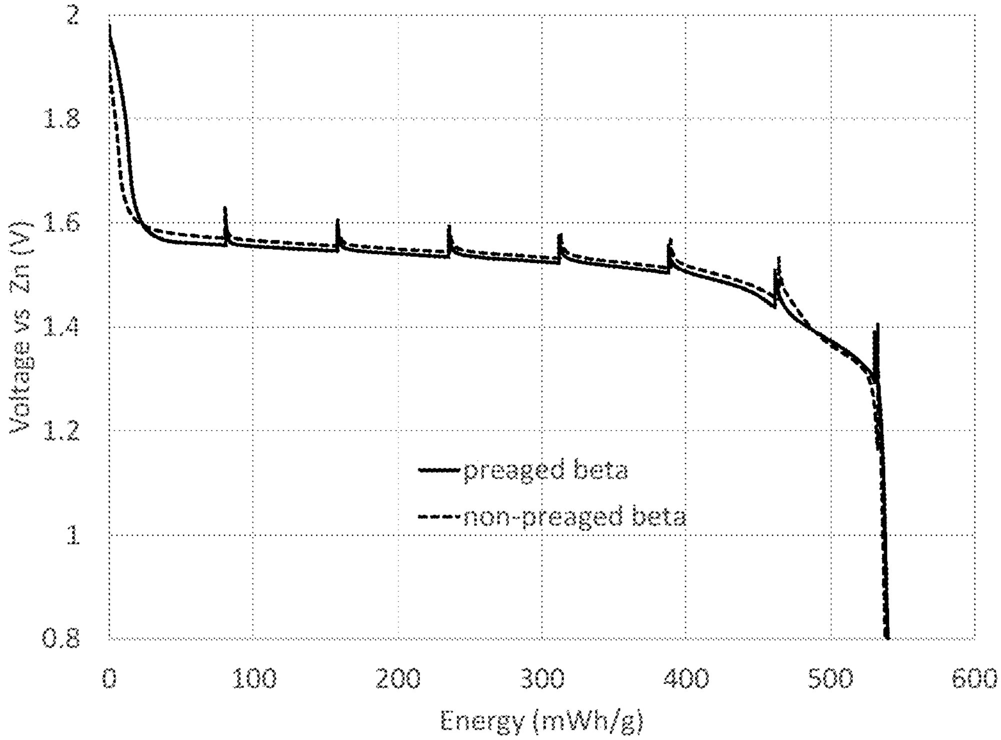
FIG. 8 shows discharge curves before and after LiOH preaged beta-nickelate with O/C=1.

Both preaged and non-preaged beta-nickelate were discharged in a cathode half-cell testing apparatus to determine the electrochemical discharge capacity as the follows: 49 wt % of the active material was mixed with 49 wt % SFG 15 graphite (oxide to carbon ratio (O/C ratio)=1) and 2 wt % coathylene binder to form a cathode mix. 200 mg of the cathode mix was pressed into a 357-button cell can with a force of 5,000 lbf. The button cell was placed into an acrylic plastic testing fixture filled with 40 wt % KOH with 6 wt % ZnO; and discharged on 10 mA/g rate with 1 hr rest for every 5 hr discharge to observe voltage recovery. The discharge rate is based on the active material. FIG. 8 shows the discharge curves of the materials. From the figure it can be seen that the LiOH preaging doesn't have much impact on the cathode discharge energy.

Example 9: Half-Cell Testing Comparison Between Preaged and Non-Preaged Beta-Nickelate Mixed with EMD with O/C Ratio=14.5

Figure 9:
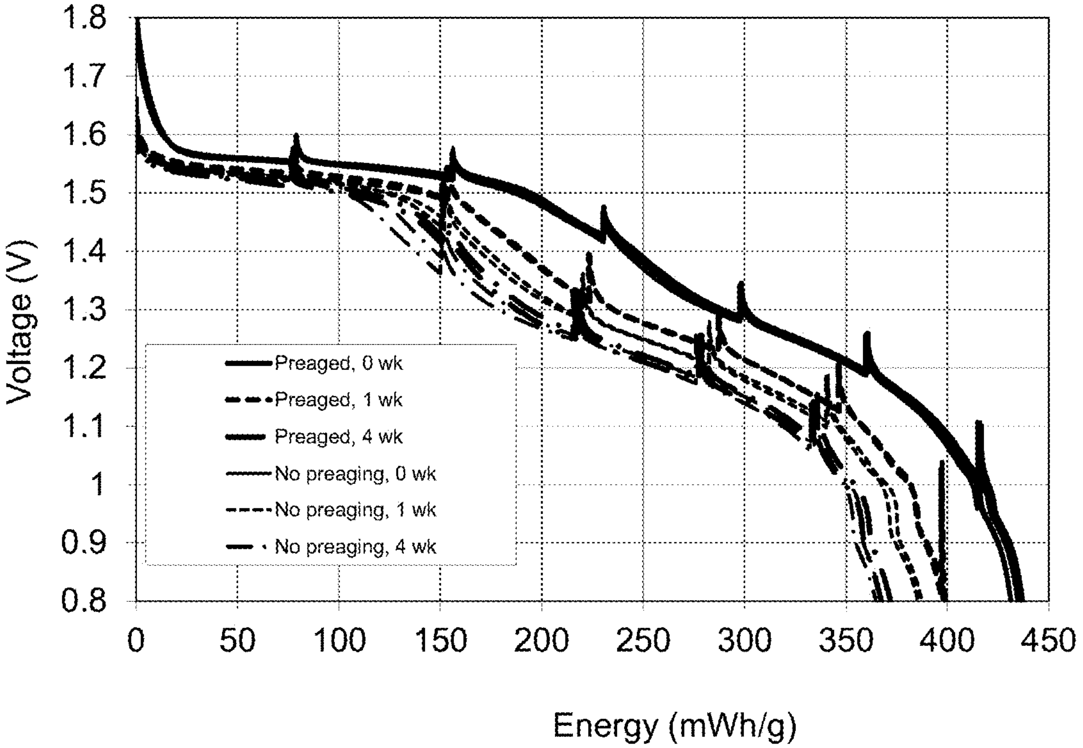
FIG. 9 shows discharge curves before and after LiOH preaged beta-nickelate mixed with EMD and O/C=14.5.

To test the cathode at an O/C ratio more closely approximating realistic cell conditions, the beta nickelate before and after preaging was mixed with Borman HD EMD, MX15 graphite and Coathylene® binder with O/C ratio 14.5. The Ni content related to total Ni and Mn is 40 wt %, the combined EMD and nickelate in the mix is 93.1 wt %, MX15 graphite 6.4 wt % and coathylene (binder) 0.5 wt %. The half-cell fixture and discharge protocol in this testing are the same as those in Example 8. However, the cathodes in the half-cell testing here were aged at 60° C. in an oven for up to 4 weeks before discharge. The discharge curves at 10 mA/g were compared in FIG. 9. One can easily see from the figure that the preaged beta nickelate is equal to the non-preaged beta nickelate in discharge energy when the half-cells are fresh (0-week aging). However, the cells with the preaged nickelate have a higher discharge voltage and energy throughout the discharge after being aged in 60° C. for both 1-week and 4-week. For example, after 1 week aging in 60° C., the discharge energy density of preaged nickelate to 1.0 V cutoff is 394 mWh/g which is higher than that of non-preaged nickelate (382 mWh/g). Therefore, the preaging increases the beta-nickelate stability in high temperature storage, and it is expected that the batteries with LiOH-preaged beta-nickelate will have a longer shelf-life than the beta-nickelate without preaging.

Figure 10:
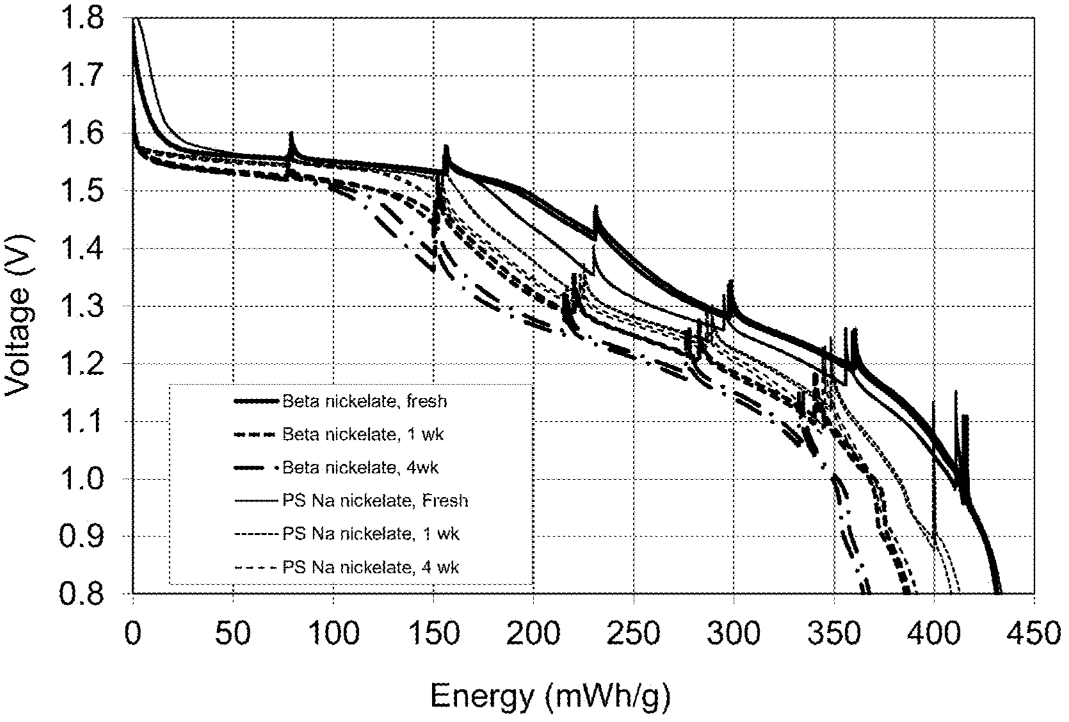
FIG. 10 shows a discharge energy comparison between beta-nickelate and persulfate desodiated and oxidized sodium nickel oxide after 60° C. aging.

Example 10: Half-Cell Discharge of Persulfate Desodiated and Oxidized Sodium Nickelate (PS Na Nickelate) and Comparison with Beta-Nickelate The cathodes with persulfate desodiated and oxidized sodium nickelate (PS Na nickelate) was discharged under the same conditions as these in Example 9 and compared with beta-nickelate in FIG. 10. From the discharge curves in FIG. 10 it can be seen that the beta nickelate has a higher discharge energy density (mWh/g) than the PS Na nickelate when the cathodes are fresh (no high temperature aging). However, after aging at 60° C., the energy density of PS Na nickelate is consistently higher than the beta-nickelate. For example, the PS Na nickelate's energy density at 1.0 V is 1.5% less than the beta-nickelate when the cathodes are fresh (without any high temperature aging). However, the PS Na nickelate's energy density at 1.0 V is 3.6% and 5.3% higher than beta-nickelate when the cathodes are aged in 60° C. for 1-week and 4-week, respectively. Therefore, it is believed that the PS Na nickelate as an alkaline cathode material would have a better service maintenance than the beta-nickelate.

Example 11: Half-Cell Discharge of Cathode with EMD/PS Na Nickelate Mix

Figure 11:
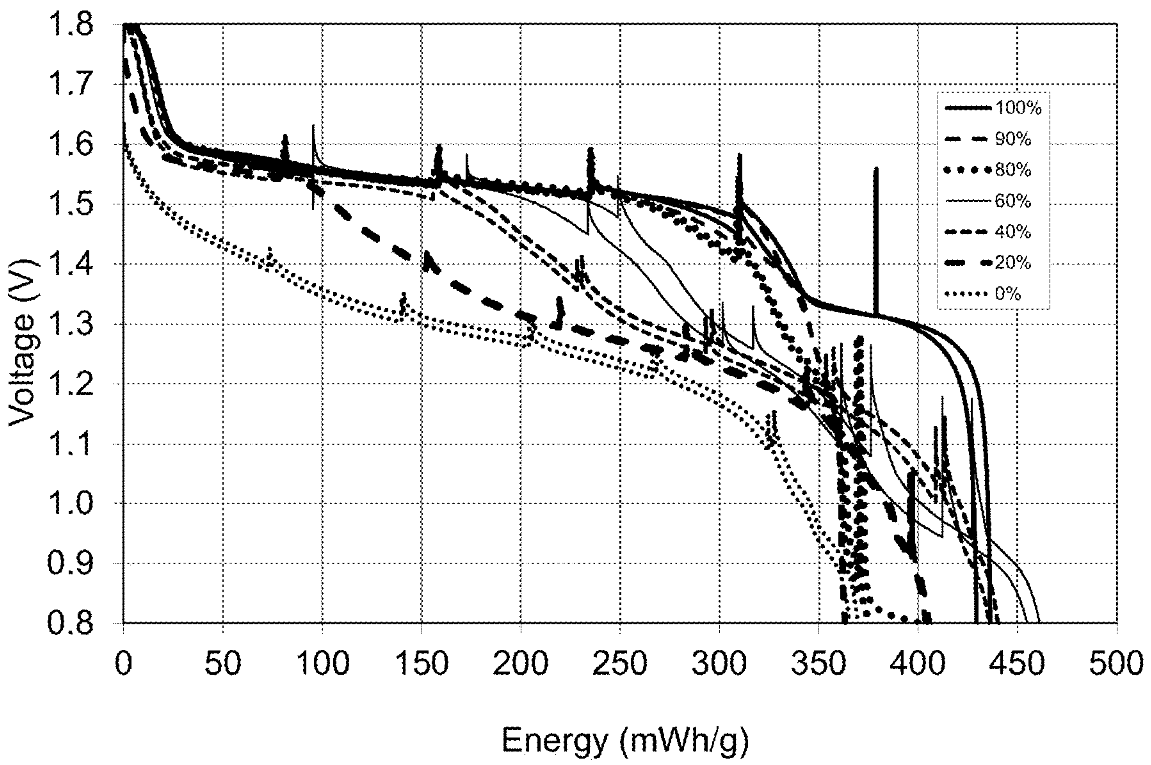
FIG. 11 shows the discharge curves of EMD mixed with various levels of persulfate desodiated and oxidized sodium nickel oxide.
Figure 12:
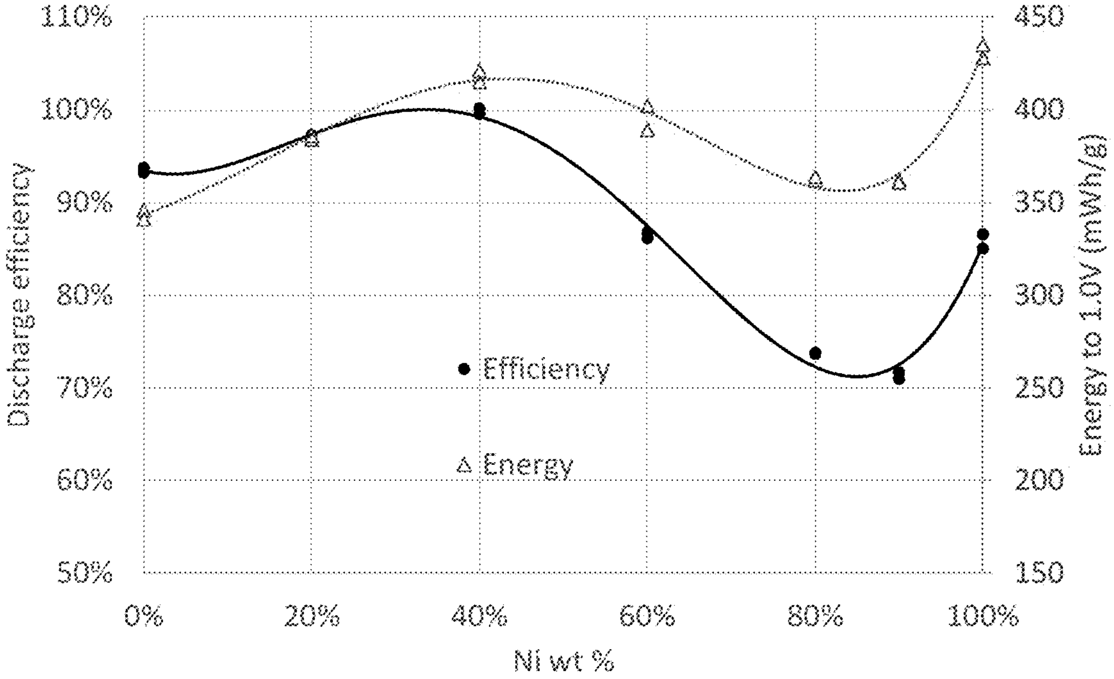
FIG. 12 shows the discharge efficiency and energy vs. Ni wt % in the EMD/nickelate mixes.

It is well known that materials containing nickel are much more expensive than EMD ($MnO_2$), and it would make more sense if a mix of EMD and PS Na nickelate could be used as a cathode material by using the advantages of low cost EMD and high performing nickelate. To investigate the synergy of EMD and the nickelate, a series of EMD/PS Na nickelate mixes with various levels of Ni wt % were evaluated in a half-cell test. The testing apparatus and cathode formulation are same as the conditions as described above (e.g., O/C=14.5, and total active material 93.1 wt % and 0.6 wt % binder %), and discharge curves are given in FIG. 11. It is no surprise that that the cathode mix with nickelate have a higher discharge voltage than cathode with EMD, and the more nickelate and the higher the voltage. However, the cathodes with high nickelate level don't always have a high energy than the cathode with a low nickelate level. For example, FIG. 11 shows that the discharge curves of the cathodes with 80 wt % and 90 wt % nickel (relative to the total weight of nickel and manganese) crossed over with the cathode with 40 wt % nickel at the voltage around 1.15 V. This could be clearly seen in FIG. 12 which is the plot of the energy density to 1.0 V vs. Ni wt %. More importantly, FIG. 12 shows the discharge efficiency with 20-40 wt % Ni is greater than 97%, while the discharge efficiency with 60-100 wt % Ni is in the range of 70% to 87%. Therefore, it is more cost effective to have cathodes with Ni wt % at 40 wt % or less. The discharge efficiency was the ratio of the discharge capacity (mAh/g) to 1.0 V in FIG. 11 to the calculated EMD (285 mAh/g) and PS Na nickelate discharge capacity (340 mAh/g) when they are discharged with O/C=1 on 10 mA/g rate similar to the conditions in Example 8.

What is claimed is:

1. A nickelate material, said nickelate material having an X-ray diffraction (XRD) pattern comprising a first peak from about 12°-14° 2Θ, a second peak from about 18°-21° 2Θ, a third peak from about 24°-25° 2Θ, and a fourth set of peaks from about 36°-43° 2Θ;

and wherein the nickelate hydride material comprises the following phases:

i) a sodium nickel oxide having the formula ($Na_xNiO_2 \cdot nH_2O$) in an amount of 40-90 wt %, wherein $0.2 \leq x < 1$ and $0 < n < 2$;

ii) nickel oxide ($NiO_2$) in an amount of 5-40 wt %; and iii) beta-nickel hydroxide (NiOOH) in an amount of 5-20 wt %.

2. The nickelate material of claim 1, wherein said nickelate material is a desodiated and oxidized sodium nickelate material.

3. An alkaline cathode composition comprising the nickelate material of claim 1 and electrolytic manganese dioxide (EMD).

4. The composition of claim 3, further comprising graphite and a binder.

5. The composition of claim 4, wherein the nickelate material is present in an amount of about 8.8-45.1 wt. %, the EMD is present in an amount of about 48-84.3 wt. %, the graphite is present in an amount of about 3-8 wt. %, and the binder is present in an amount of about 0.1-5 wt. %, relative to the total weight of the nickelate, EMD, graphite, and binder.

6. The composition of claim 4, wherein the total weight percentage of the nickelate and EMD material, combined, is about 92-97 wt. %, the graphite is present in an amount of about 2-7 wt. %, and the binder is present in an amount of about 0.1-1.0 wt. %.

7. An alkaline electrochemical cell comprising the nickelate material of claim 1.

* * * * *